Dec. 12, 1967     L. M. PERKINS     3,358,110
ELECTRICAL CONTROL HINGE
Filed Sept. 26, 1966     3 Sheets-Sheet 1
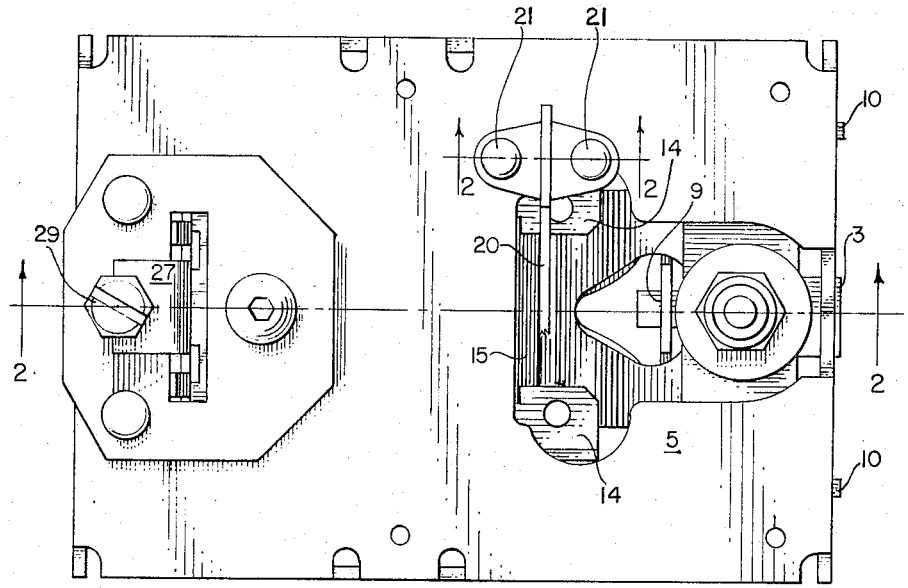
FIG. 1.
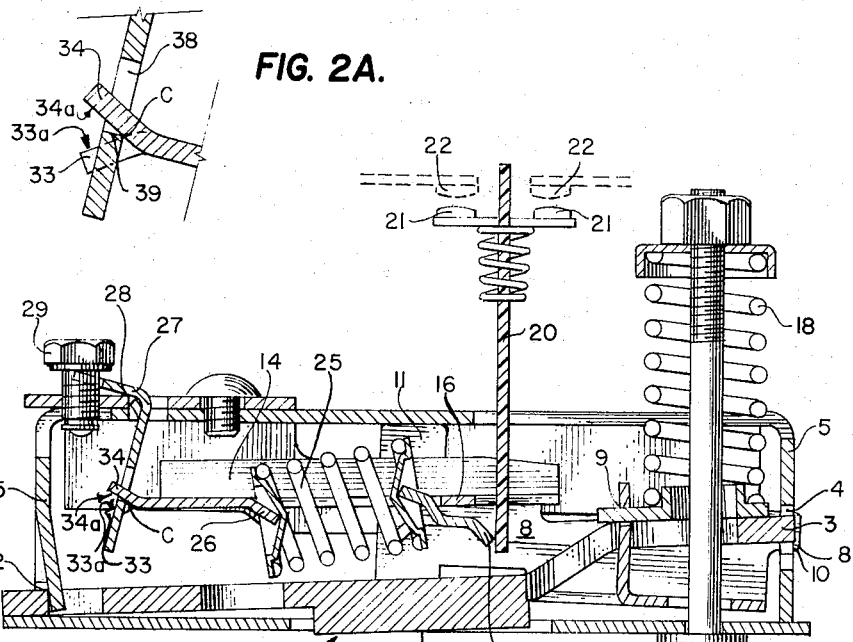
FIG. 2A.
FIG. 2.
INVENTOR
LAURENCE M. PERKINS
BY Richard C. Steinmetz Jr.

Dec. 12, 1967   L. M. PERKINS   3,358,110
ELECTRICAL CONTROL HINGE
Filed Sept. 26, 1966   3 Sheets-Sheet 2

INVENTOR
LAURENCE M. PERKINS

BY Richard C. Steinmetz Jr.

Dec. 12, 1967   L. M. PERKINS   3,358,110
ELECTRICAL CONTROL HINGE

Filed Sept. 26, 1966   3 Sheets-Sheet 3

INVENTOR
LAURENCE M. PERKINS

BY *Richard C. Steinmetz Jr.*

United States Patent Office 3,358,110
Patented Dec. 12, 1967

3,358,110
ELECTRICAL CONTROL HINGE
Laurence M. Perkins, Elm Grove, Wis., assignor to Allen-Bradley Company, Milwaukee, Wis., a corporation of Wisconsin
Filed Sept. 26, 1966, Ser. No. 582,017
15 Claims. (Cl. 200—166)

ABSTRACT OF THE DISCLOSURE

Hinge for an electrical control having members which abut along a common linear line formed by the line edge of one member meeting the surface of a second member. The surfaces of the respective members form an angle with the common line passing through the apex of such angles.

---

This invention is directed to an electrical control device utilizing a particular hinge structure to provide maximum efficiency.

In devices used for electrical control it is often of significant importance that the mechanical pivot points be of a simple construction and yet provide a minimal friction resistance. Points of fine adjustment and pivot points integral to snap action switching devices, as shown in the detailed description which follows, exemplifies the need and applications for the structure of this invention.

It is an object, therefore, of this invention to provide a simple but efficient mechanical hinge structure for an electrical control device.

It is a further object of this invention to provide a hinge structure which permits positive and predetermined location of the structural members making up the hinge.

It is a further object of this invention to provide hinge structure for an electrical control device which operates with a minimum of frictional resistance.

A still further object of this invention is to provide a hinge for an electrical control utilizing two members which meet along a common line with said line formed at distinct portions of line contact by a line edge of one member meeting the surface of one member.

These and other objects of the invention will become apparent from the following description of the hinge as used in particular environments. These descriptions are to be considered only exemplary with the scope of the invention to be found in the appended claims.

In the drawings:

FIGURE 1 is a partial, plan view of an electrical control device responding to pressure incorporating the hinge structure of this invention.

FIGURE 2 is a partial, cross-sectional, side view of the pressure switch taken along the lines 2—2 of FIGURE 1.

FIGURE 2a is a magnified view of the members forming the hinge of the invention as shown in FIGURE 2.

Figure 3:
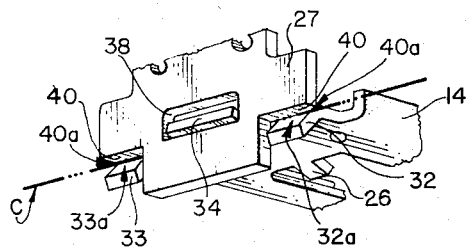
FIGURE 3 is a partial, isometric view of the members forming the hinge structure as used in the switch of FIGURES 1 and 2.

The pressure responsive electrical switch of FIGURES 1 and 2 will only be described with detail sufficient to understand the invention. A Force F, e.g. a channeled fluid pressure, is applied to the arm 1 which is pivoted at one end 2 and is guided at the other end 3 in the slot 4 of the switch frame 5. The motion of arm 1 is transferred to the arm 8 through the inner connection of the two arms at 9. The arm 8 is pivoted at one end through tabs 10 which pivot on the end of a slot in the frame 5 with motion in an upward direction, as viewed in FIGURE 2, stopped as the end 11 of arm 8 abuts the frame 5 as shown in FIGURE 2.

Pivoted arm 14 is moved in response to movement of arm 8 through the toggle spring 25 as it passes through its center position. Spring 18 applies a force upon the interrelated arms 1, 8 and 14 through abutment with the arm 1 so as to provide a predetermined load on the mechanism and therefore establish desired operation of the switch mechanism in response to Force F. A contact carrier 20 which is symmetrical as viewed in FIGURE 1 but which is shown only in part for illustrative purposes, is movably connected to the arm 14 through slots in the carrier 20 (not shown) which slots engage the arm 14 so as to move the contacts 21. This switching structure is shown in the drawings in functional form through the fixed contacts 22 (FIGURE 2) with respect to which the movable contacts 21 move to establish open and closed switch positions. In particular, FIGURE 2 shows the arm 14 in a down position as a result of a sufficient Force F having been applied to arm 1. The movable contacts 21 have thus been moved from their normally closed position with fixed contacts 22 to the contact open position shown in the drawings.

The switch of FIGURE 2 will remain in the position shown as long as a predetermined Force F is applied to arm 1. The particular minimum Force F below which the arm 14 will move to an up position—carrying movable contacts 21 to a closed position—is determined by the center position of toggle spring 25 which is a function of the spring 25 compression. As shown in FIGURE 2, the toggle spring 25 is located between the cross-bar 15 of arm 8 and the pivot portion 26 on arm 14. Adjustment of spring 25 compression is achieved through movement of the lever 27 pivoted at 28 and responding to the positioning of the screw 29. The arm 14 and the lever 27 constitute the members which are pivotably connected as the particular hinge structure of this invention.

Figure 4:
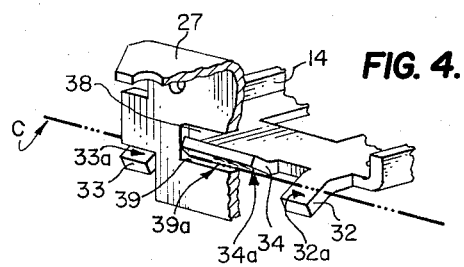
FIGURE 4 is a partial, isometric view of the members forming the hinge structure as shown in FIGURE 3 but taken from a different perspective.

The details of this hinge structure are shown in FIGURES 2a, 3 and 4. Only line contact between the members which make up the hinge, viz lever 27 and arm 14, is to be found in this hinge construction. Moreover, this line contact, which exists as several distinct portions of line contact, also lies along a single linear line which can be drawn through each portion of line contact as a common linear line. In the FIGURES 3 and 4 this common line is shown as line C; and in FIGURE 2a line C can only be represented as a dot C since the line extends perpendicular to the page.

Specific to the switch of FIGURES 1–4, the common line C is established by line edges of one member meeting a surface of one member at distinct portions of line contact. While the surfaces are not necessarily always each a part of one member, the hinge shown in the FIGURES 1–4 is so constructed. That is, the arm or member 14 has means such as fingers 32, 33 and 34 extending from an end which abuts the lever or member 27; and each finger means has a respective surface 32a, 33a and 34a. At least one of the surfaces, e.g. surface 34a, is formed at an angle with respect to the companion surfaces 32a and 33a when viewed from the side as in FIGURE 2a; with this angle having for its apex the common line C about which the hinge of the invention pivots. This angle between the surfaces may vary but must be greater than 0°—usually less than 120°, but an angle must always exist between the surfaces and about the apex of the common line C in order to permit the line edges of the abutting member such as lever 27 to establish the line contact with each surface along the common line C.

In FIGURES 1–4, the line edges in lever 27 are formed in part from line edge 39a of the bottom 39 in cutout portion 38 which abuts surface 34a of arm 14. In addition, the outer ends 40 of arm 27 each have line edges 40a which form an extension of a line drawn through line edge 39a and which abut surfaces 32a and 33a of arm 14. These three line contacts between line edges 30a, 40a and surfaces 34a, 32a and 33a respectively occur as distinct portions of line contact along the common line C.

Lateral movement of the members 14 and 27 along the common line C is restrained by the finger means 32, 33 and 34 which have a close enough fit with lateral portions of the lever 27 to so restrain this lateral motion.

Figure 9:
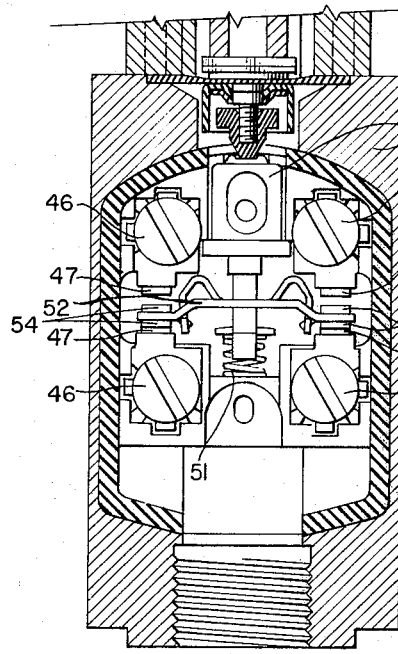
FIGURE 9 is a cross-sectional view of an electrical switch structure incorporating the snap action electrical switch of FIGURE 5.
Figure 10:
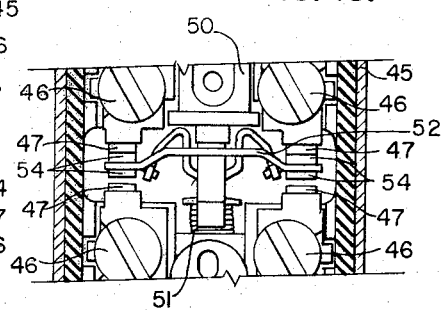
FIGURE 10 is a partial, cross-sectional view of the switch as shown in FIGURE 9 but with the plunger, and consequently the electrical contacts, moved to an alternate position.

Another electrical control environment in which this hinge may be used is the snap action electrical switch shown in FIGURES 5 through 13. FIGURES 9 and 10 show the particular snap action switch to be described hereafter located in a limit switch by way of example. Details of this limit switch, excluding the particular snap switch can be found in U.S. Patent 2,796,487. Generally, this limit switch includes a housing 45 with terminals 46 connecting the fixed contacts 47. A force is applied to the plunger 50 which is biased by spring 51 to move the plunger 50 from the position of FIGURE 9 to that of FIGURE 10 and thereby change the position of the contact blade 52 and the integral movable contacts 54 between the FIGURE 9 and FIGURE 10 positions. Snap action is achieved through the spring blades 53 which are biased against both the plunger 50 and contact blade 52 in the contact blade aperture 55 as will be described below.

Figure 5:
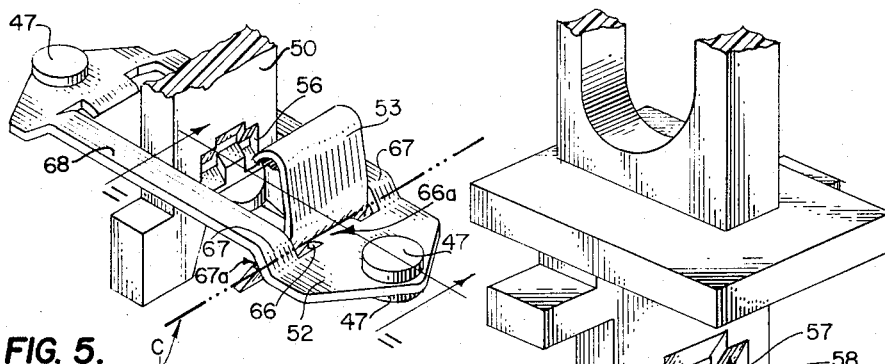
FIGURE 5 is a partial, isometric view of a snap-action electrical switch incorporating the hinge of this invention.

Those basic elements of the electrical snap switch, viz plunger 50, contact blade 52 as well as spring blade 53 and the movable contacts 54 mounted on the contact blade 52, are shown in perspective in the view of FIGURE 5. The mechanical pivotal connection between the spring blade 53 and both the contact blade 52 and plunger 50 utilizes the hinge construction described above in connection with the pressure switch of FIGURES 1 and 2 but which will be described in more detail hereafter.

Figure 6:
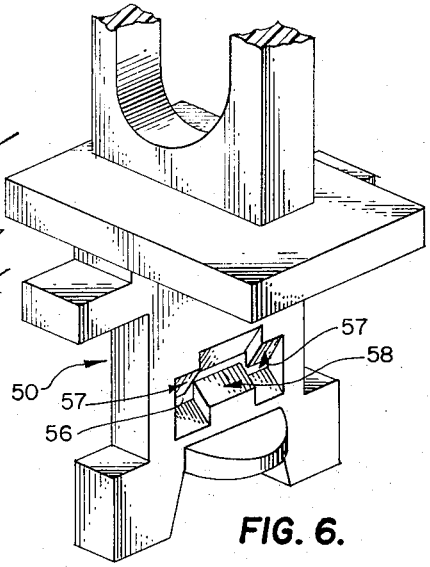
FIGURE 6 is a partial, isometric view of the plunger utilized in the electrical switch of FIGURE 5 and showing in more detail that portion of the plunger which makes up the structure of the invention.

The depression 56 in plunger 50 is shown with sufficient detail in FIGURE 6 so that the hinged relationship between the plunger 50 and the spring blade 53 will be better understood. The two recessed surfaces 57 near the upper portion of the depression 56 as viewed in FIGURE 6 are laterally spaced with respect to the recessed surface 58 at the lower portion of the depression 56. When viewed from the side as in FIGURE 12, these surfaces 57 and 58 form as companion surfaces an angle with an apex which is the common line C (this common line C being a dot in FIGURE 12 since the line C is perpendicular to the page). In a manner similar to the hinge description above in connection with FIGURES 1 and 2, the hinge member or spring blade 53 abuts the hinge member in the form of recessed surfaces 57 and 58 at distinct portions of line contact, and again these points of line contact lie along a common line drawn therethrough and indicated, as before, as common line C.

Figure 7:
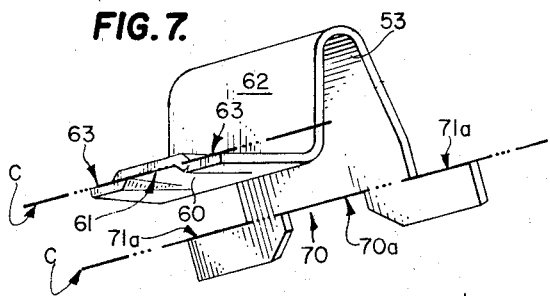
FIGURE 7 is an isometric view of the spring blade used in the electrical switch of FIGURE 5, which view shows a particular construction incorporated with the hinge of the invention.
Figure 8:
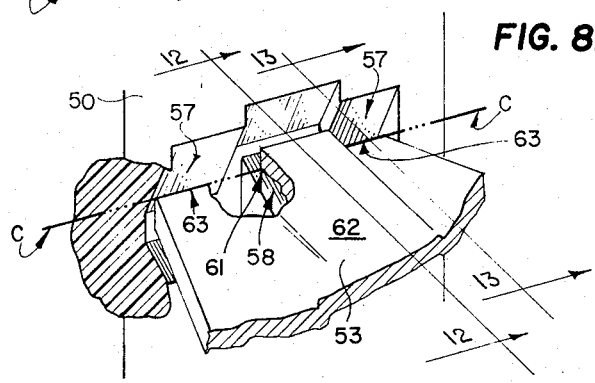
FIGURE 8 is a partial, isometric view of the electrical switch shown in FIGURE 5 including a portion of the plunger as shown in FIGURE 6 in combination with one end of the spring as shown in FIGURE 7, thus forming the hinge of this invention.

FIGURE 7 shows the configuration of the spring blade 53 with the lower face 60 formed as line edge 61 so as to be an extension of a line drawn through line edges 63 of the upper face 62. When the spring blade 53 is inserted into a depression 56 of plunger 50, line edge 61 abuts the recessed surface 58 in line contact while the line edges 63 abut the recessed surfaces 57 in line contact—each along the common line C.

Figure 12:
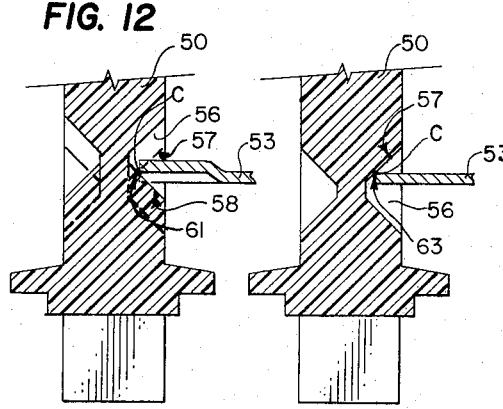
FIGURE 12 is a partial, cross-sectional view taken along the line 12—12 of FIGURE 8 showing hinge detail.
Figure 13:
FIGURE 13 is a partial, cross-sectional view taken along line 13—13 of FIGURE 8 showing additional hinge detail.

FIGURES 12 and 13 show with some detail the relation between the surfaces 57 and 58 and the line edges 61 and 63. The common line C appears in these figures as a dot. In FIGURE 12 the line edge 61 of spring blade 53 lever face 60—resulting from the deformation of spring blade 53 in order to raise line edge 61 into a common line with line edges 63—and surface 58 are immediately visible, while in FIGURE 13 one line edge 63 of spring blade 53 upper face and one surface 57 are immediately visible.

Figure 11:
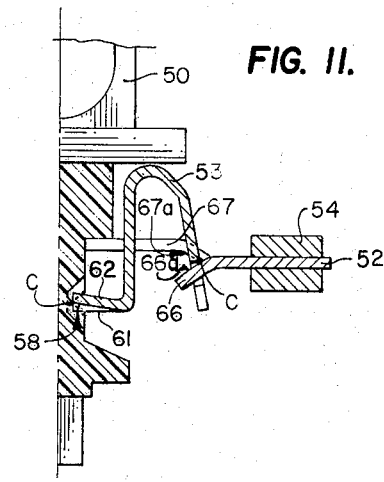
FIGURE 11 is a partial, cross-sectional view taken along line 11—11 of FIGURE 5 showing the details of the hinge construction as utilized in the snap-action electrical switch.

The hinge relationship between the spring blade 53 and the contact blade 52 utilizes a finger means 66 with a surface 66a which is bent in a first direction to extend into the aperture 55 of contact blade 52 and finger means in the form of the leg portions 67 and 68 of the aperture 55 for contact blade 52. These leg portions 67 and 68 are bent in a second direction so that surfaces 67a and 68a thereon will form as companion surfaces an angle about an apex when viewed from the side (FIGURE 11); which apex is the common line C for hinge pivoting as previously described. The end of the spring 53 has a cutout portion 70 which abuts the surface 66a of the contact blade 52 with line edge 70a in a line contact as shown in FIGURES 5 and 11. Also provided on the spring blade 53 are tab means 71 which are adjacent the cutout portion 70 and which have line edges 71a forming an extension of the line edge 70a as best shown in FIGURE 5. Again, these distinct portions of line contact between the contact blade 52 and the spring blade 53 lie along a common line which can be drawn therethrough and which is designated as common line C (see FIGURE 5). In FIGURE 11, this common line C is shown as a dot at the apex of the angle formed by the surface 66a and the line edge 70a.

I claim:

1. A hinge in an electrical control comprising:
   (a) members of said electrical control abutting in hinged pivotal relation at distinct portions of line contact along a common linear line drawn therebetween,
   (b) said distinct portions of line contact spaced laterally along said drawn common line,
   (c) said common line formed at each distinct portion of line contact by:
      (1) the line edge of one said member and
      (2) the surface of an abutting said member,
   (d) at least one said surface forming an angle with a companion said surface with said common line acting as the apex for said angle.

2. The hinge of claim 1 wherein there are at least three distinct portions of line contact.

3. The hinge of claim 1 wherein,
   (a) said one member comprises said line edge at each said distinct portion of line contact,
   (b) said abutting member comprises said surface at each said distinct portion of line contact.

4. The hinge of claim 3 wherein said line edges at each said distinct portion of line contact are common to a single linear line drawn therethrough.

5. The hinge of claim 1 wherein said surfaces comprise finger means bent to form an angle at said apex.

6. The hinge of claim 5 wherein said finger means abut the adjacent said member to limit relative motion in a direction parallel to said common line.

7. The hinge of claim 1 wherein,
  (a) said one member has a cutout portion including a said line edge,
  (b) said surfaces of said abutting member are a part of finger means one of which is inserted into said cutout portion of said first member to form with said line edge a said distinct portion of line contact.

8. The hinge of claim 1 wherein,
  (a) said abutting member is a contact blade of said electrical control having an aperture therethrough,
  (b) a plunger passes through said aperture,
  (c) said one member is a spring blade which is interposed between said plunger and said contact blade,
  (d) said contact blade and said spring blade meeting to form said hinge.

9. The hinge of claim 8 wherein,
  (a) said at least one surface extends into said aperture of said contact blade,
  (b) said companion surface is a leg of said contact blade bounding said aperture.

10. The hinge of claim 9 wherein,
  (a) said spring blade has a cutout at the end adjacent said contact blade,
  (b) said cutout includes said line edge to establish said line contact with said surface extending into said aperture.

11. The hinge of claim 10 wherein,
  (a) said spring blade has tab means adjacent said cutout portion,
  (b) said tab means include said line edge to establish said line contact with said surface formed by said leg of said contact blade.

12. The hinge of claim 11 wherein there are two surfaces each formed by one said leg of said contact blade.

13. The hinge of claim 1 wherein,
  (a) said electrical control means comprise contact blade means having a central aperture therethrough,
  (b) said abutting member is a plunger passing through said aperture,
  (c) said one member is a spring blade means which is interposed between said plunger means and said contact blade means,
  (d) said plunger and said spring blade meeting to form said hinge.

14. The hinge of claim 13 wherein,
  (a) said surfaces are recessed in said plunger,
  (b) said spring blade is deformed at the end adjacent to said plunger so as to form distinct line edges to abut said surfaces of said plunger in said common line at said distinct portions of line contact.

15. The hinge of claim 14 wherein there are three recessed surfaces.

References Cited
UNITED STATES PATENTS

| | | | |
|---|---|---|---|
| 2,500,476 | 3/1950 | Stoeser | 200—67 |
| 2,824,197 | 2/1958 | Bolek | 200—67 |
| 3,030,465 | 4/1962 | Roeser | 200—67 |
| 3,056,002 | 9/1962 | Ball | 200—67 |

ROBERT K. SCHAEFER, *Primary Examiner.*

H. O. JONES, *Assistant Examiner.*